United States Patent [19]

Clark et al.

[11] Patent Number: 4,987,533
[45] Date of Patent: Jan. 22, 1991

[54] METHOD OF MANAGING DATA IN A DATA STORAGE HIERARCHY AND A DATA STORAGE HIERARCHY THEREFOR WITH REMOVAL OF THE LEAST RECENTLY MOUNTED MEDIUM

[75] Inventors: Connie M. Clark; Warren B. Harding; Horace T. S. Tang, all of Tucson, Ariz.

[73] Assignee: International Business Machines Corporation, Armonk, N.Y.

[21] Appl. No.: 190,739

[22] Filed: May 5, 1988

[51] Int. Cl.$^5$ .................. G11B 7/00; G11B 11/00
[52] U.S. Cl. .................. 364/200; 369/36; 364/249.4; 364/248.1
[58] Field of Search ............... 369/36; 364/200, 900

[56] References Cited

U.S. PATENT DOCUMENTS

| | | | |
|---|---|---|---|
| 3,588,839 | 6/1971 | Belady et al. | 340/172.5 |
| 4,020,466 | 4/1977 | Cordi et al. | 340/172.5 |
| 4,077,059 | 2/1978 | Cordi et al. | 364/200 |
| 4,463,424 | 7/1984 | Mattson et al. | 364/300 |
| 4,614,474 | 9/1986 | Sudo | 369/36 |
| 4,636,946 | 1/1987 | Hartung et al. | 364/200 |
| 4,685,095 | 8/1987 | Rudy et al. | 369/36 |
| 4,787,074 | 11/1988 | Deck et al. | 369/36 |
| 4,864,511 | 9/1989 | Moy et al. | 369/39 |

OTHER PUBLICATIONS

*Phillips Technical Review*, vol. 39, No. 12, 1980, "Megadoc, a Modular System for Electronic Document Handling", by de Vos.

*IBM Technical Disclosure Bulletin*, vol. 24, No. 1A, Jun. 1981, "Management Technique for Memory Hierarchies", by C. M. May, pp. 333–335.

*IBM Technical Disclosure Bulletin*, vol. 21, No. 6, Nov. 1978, "Data Move Optimization in Mass Storage Systems", by D. P. Kinard et al., pp. 2247–2249.

*IBM Technical Disclosure Bulletin*, vol. 15, No. 9, Feb. 1973, "Mass Storage Device", by C. E. Dorrell et al., pp. 2943–2945.

*IBM Technical Disclosure Bulletin*, vol. 11, No. 12, May 1969, "Buffer Store Replacement Control", by L. J. Boland, pp. 1738–1739.

*Primary Examiner*—Lawrence E. Anderson
*Attorney, Agent, or Firm*—Floyd E. Anderson

[57] ABSTRACT

A method for managing data in a data storage hierarchy, and a data storage hierarchy suitable therefor, is disclosed. The data storage hierarchy includes an optical library and separate manually operated shelf storage. The optical library includes at least one optical disk drive and a plurality of storage cells for the storage of optical disks. The optical library also includes automatic means for transferring optical disks from the storage cells to the optical disk drives in the library. The host processor, upon determining that particular data is required to be stored in the optical library, first checks to determine if the optical disks in the optical library currently have the capacity for the storage of such data. If the capacity exists in the optical library there is no problem and the data is stored therein. If the optical library does not have the required capacity, or if the system operator so requires, the optical disk in the optical library which has least recently been mounted on an optical disk drive therein is destaged from the optical library to the manually operated shelf storage. Another disk may then be fed into the optical library for the storage of the data required therein.

15 Claims, 1 Drawing Sheet

METHOD OF MANAGING DATA IN A DATA STORAGE HIERARCHY AND A DATA STORAGE HIERARCHY THEREFOR WITH REMOVAL OF THE LEAST RECENTLY MOUNTED MEDIUM

BACKGROUND OF THE INVENTION

1. Field of the Invention

This invention relates to a method for managing data in a data storage hierarchy and a hierarchy employing such a method. More particularly, the method relates to destaging operations in a data storage hierarchy.

2. Description of the Related Art

It is desirable to store computer data in such a manner that it be immediately available when required. Fast access to data can be achieved by using a very large high speed data storage device. However, the price of data storage increases as both the speed and capacity of the data storage device increases. Therefore, high speed memories are typically of a relatively small capacity, which is often exceeded by the amount of data required to be stored for a given application. When a given application requires data storage exceeding that of high speed memory, it becomes impractical to rely on a single low speed, high capacity data storage device because access time to the data becomes prohibitively large.

The access time to data may be improved by employing a data storage hierarchy in place of a single data storage device. A data storage hierarchy consists of multiple levels of data storage devices. The highest level, or first level, is typically the smallest, fastest, and most expensive form of data storage. The size of data storage increases and the speed and cost of data storage typically decreases as the level of storage in the hierarchy also decreases. Examples of data storage devices employed in hierarchies include: semiconductor device main and cache memory, magnetic tape drives, magnetic drums, magnetic disk drives, and optical disk drives. These devices may be used in a variety of combinations and levels to create a data storage hierarchy. In addition, a level of the data storage hierarchy may be comprised of a magnetic tape, magnetic disk, or optical disk library. A library, or mass storage system, includes one or more data storage devices, a plurality of storage cells, and a mechanism for automatically transferring data storage media between the storage cells and the storage devices. For example, an optical disk library could include one or more optical disk drives, a plurality of storage cells for storing optical disks, and mechanized means for transferring the disks between the storage cells and the optical disk drives. The existence of libraries is well known, as evidenced by an article to Dorrell and Mecklenburg. (Mass Storage Device, IBM Technical Disclosure Bulletin, Vol. 15, No. 9, Feb. 1973, pp. 2943-45.)

Typically, a system including a data storage hierarchy is programmed such that all data contained therein are initially stored in the highest level of the hierarchy. Over time, according to rules programmed into the hierarchy, data are transferred between different levels of the hierarchy to meet the system storage and access needs. When the host processor requires particular data, the location of the data in the hierarchy is first determined. If the data required is stored in the highest level of the hierarchy, the data is retrieved and used. If the data is not stored in the highest level of the hierarchy, it can be retrieved for use directly from its present location, if possible, or first transferred to the highest level of the hierarchy and then retrieved from that level. The movement of data from a relatively low level of the hierarchy to a relatively high level of the hierarchy is known as "staging". The data is staged so as to permit the system rapid access to the data as required in the future. Since data that has recently been used is often likely to be used again shortly thereafter, the presence of the data in the highest level of the hierarchy increases the overall speed of the system. The ability to directly access the data at a lower level of the hierarchy depends on the system connections and type of data storage devices at each level. The data that is accessed from a lower level of the hierarchy is typically determined to be relatively unlikely to be accessed frequently.

A common problem in data storage hierarchies is the relative size of each level of the hierarchy. The high cost of high speed memory requires that the size of the highest or higher levels of the hierarchy be limited. As a result, although data storage hierarchies nevertheless improve the speed of data access over single data storage devices, the capacity of the highest levels of the hierarchy can be exceeded. Use of the highest levels of the data storage hierarchy can be optimized by prioritizing the storage of data at each level. For example, the system may be designed such that data is rated according to its likelihood of use and the level at which it is generally stored is determined thereby. In addition, data may be transferred from relatively higher levels of the hierarchy to relatively lower levels of the hierarchy, as it becomes accessed less frequently over time. The movement of data from a relatively higher level of the hierarchy to a relatively lower level of the hierarchy is known as "destaging". As with staging, destaging may be prioritized according to the frequency of use of particular data. Data not likely to be accessed frequently can be destaged to a relatively low level of the hierarchy for archival purposes.

The destaging of data may be used for several purposes. As previously mentioned, data may be destaged as it ages and becomes less likely to be accessed. In addition, there is always the risk that the capacity of the relatively higher levels of the hierarchy can be exceeded, despite the aforementioned prioritization of the storage of data at each level of the hierarchy. When the system requires a staging or destaging operation to be performed such that data is to be transferred to a level of the hierarchy for which the storage capacity has been exceeded, data in that level must first be destaged to create storage availability for the data desired to be staged or destaged. Thus, system optimization requires management techniques for both the staging and destaging of data.

Techniques for efficiently destaging data in a data storage hierarchy are known. The simplest destaging technique includes random choice of the data to be destaged, as disclosed in U.S. Pat. No. 3,588,839. It is also known to choose data for destaging on a first-in first-out (FIFO) basis. See, for example, Boland, L.J., Buffer Store Replacement Control, IBM Technical Disclosure Bulletin Vol. 11, No. 12, May 1969, pp. 1738-39, Kinard, et al., Data Move Optimization in Mass Storage Systems, IBM Technical Disclosure Bulletin Vol. 21, No. 6, Nov. 1978, pp. 2246-49, May, C M., Management Technique for Memory Hierarchies, IBM Technical Disclosure Bulletin Vol. 24, No. 1A, June 1981, pp. 333-335. It is also known to stage data in a manner such that the number of destaging operations is minimized. This may be accomplished by staging data in large units, as opposed to merely the exact data currently required to be staged on the theory that data stored physically or logically nearby data currently requiring access is more likely to be accessed in the future than data stored elsewhere in the hierarchy. By staging a larger unit of data than actually required, the need to stage again in the future is eliminated. Since only a single staging operation is required, what otherwise would have been two separate destaging operations are efficiently combined into a single destaging operation. A sample unit used in such a staging and destaging technique would be a complete track of a magnetic storage disk.

The least recently used (LRU) technique is another known for example, U.S. Pat. Nos. 4,020,466 and 4,077,059 disclose a system in which data to be destaged is determined by the time at which the data stored was last accessed. Only data which has been accessed since it was stored at its current level of the hierarchy can be destaged, such destaging performed beginning with the data least recently accessed. Similar systems are shown in U.S. Pat. Nos. 4,530,054 and 4,463,424. Modifications of the least recently used destaging technique are known. For example, U.S. Pat. No. 4,636,946 discloses first determining the least recently used data for destaging, and then destaging along with that data other data having certain characteristics in common therewith. The common characteristics may be, for example, storage in the same physical or logical location of the level of the hierarchy. By destaging multiple records at one time, staging and destaging operations are minimized.

Several problems are associated with the least recently used destaging technique. First, the technique is complex in that both the time of entry of the data in the current level of the hierarchy and the time of access of the data must be available. Also, where the size of the data records to be destaged is typically quite larger than the amount of data which can be interpreted by the host processor at any given time, the host processor may be tied up during a long series of destaging operations. If the hierarchy includes a write-once recording media for archival purposes, destaging will not eliminate the data from the upper levels of the hierarchy. Such archival purposes include the storage of data not likely to be frequently accessed, such as business records. Finally, in hierarchies including a library, the likelihood of future access to data may not correlate particularly well to the time of recent accesses or even to the time of entry of the data into the library.

SUMMARY OF THE INVENTION

In view of the foregoing, it is the principal object of this invention to improve methods for managing data in data storage hierarchies and data storage hierarchies therefor.

Another object of the invention is an improved method of destaging data in a data storage hierarchy and a data storage hierarchy therefor.

These and other objects are accomplished by a data storage hierarchy including an optical library and separate manually operated shelf storage for optical media. The optical library includes at least one optical disk drive and a plurality of storage cells for the storage of optical disks. The optical library also includes automatic means for transferring optical disks from the storage cells to the optical disk drives in the library. The host processor, upon determining that particular data is required to be stored in the optical library, first checks to see if the optical disks in the optical library currently have the capacity for the storage of such data. If the capacity exists in the optical library there is no problem, and the data is stored therein. If the optical library does not have the required capacity, then the optical disk in the optical library which has least recently been mounted on an optical disk drive therein—irrespective of host processor accesses to the mounted disk—is destaged from the optical library to the manually operated shelf storage. Another disk may then be fed into the optical library for the storage of the data required therein.

The foregoing and other objects, features, and advantages of the invention will be apparent from the following more particular description of the preferred embodiment of the invention, as illustrated in the accompanying drawing.

DESCRIPTION OF THE PREFERRED EMBODIMENT

Figure 1:
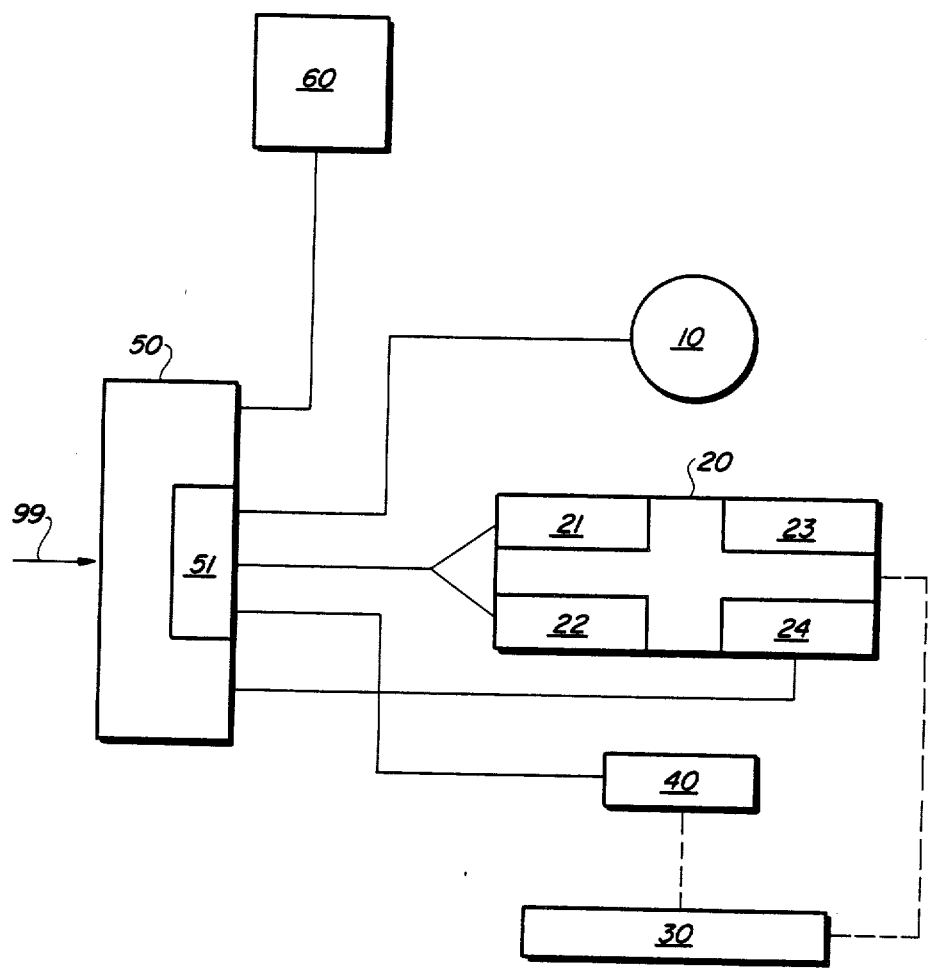
FIG. 1 is a schematic diagram of a data storage hierarchy according to the invention.

A data storage hierarchy according to the invention will now be described with reference to FIG. 1. The data storage hierarchy includes three levels of data storage. The different levels of data storage are generally associated with different degrees of data storage capacity and different access times. The lower the level of the hierarchy the higher the data storage capacity of that level and typically, the slower the access time to the data stored in that level. The first level of data storage is magnetic direct access storage devices (DASD) 10. The precise number of magnetic disk drives or magnetic disks operable thereon in the hierarchy is not significant with respect to the invention. The second level of data storage in the hierarchy is optical library 20. Optical library 20 includes optical disk drives 21 and 22, storage cells 23 for storing optical disks therein, and control 24 for automatically transferring optical disks between optical disk drives 21 and 22 and storage cells 23. Write-once, read-many (WORM) optical libraries are commercially available, the details and operation of which are known to one of skill in the art. For example, control 24 typically includes an automated robot capable of indexing between different storage cells so as to locate a particular cell and thereby enable said robot to exchange optical disks between storage cells 23 and optical disk drives 21 and 22. The third level of data storage in the hierarchy is represented by optical disk shelf storage 30. Optical disk shelf storage 30 is simply shelf storage arranged in an indexed fashion such that optical disks may be placed in storage or retrieved from storage manually. Thus, a system operator can manually transfer optical disks between optical library 20 and optical disk shelf storage 30. Also, new or "scratch" disks may be inserted into optical library 20 without first being stored in optical disk shelf storage 30. Of further significance is optical disk drive 40 which is a stand alone unit existing separate and apart from optical library 20. The optical disks stored in optical library 20 or optical media shelf storage 30 are compatible with optical disk drive 40. The optical disks are all of such type, for example, WORM optical disks, that reading and writing may be accomplished by optical disk drive 40 or optical disk drives 21 and 22. Optical disk drive 40 is in a sense in the same level of the data storage hierarchy as optical library 20 because a disk mounted on optical disk drive 40 or either of optical disk drives 21 and 22 potentially has the same characteristic access time. However, an optical disk stored in storage cells 23 of optical library 20 can be mounted and accessed more quickly (by automation) than an optical disk existing in optical disk shelf storage 30.

In the present embodiment, the optical disks used in both optical library 20 and optical disk shelf storage 30 are WORM disks. Optical library 20 and optical disk shelf storage 30 are shown connected in FIG. 1 by a dotted line to indicate the ability to manually transfer disks therebetween Likewise, the dotted line between optical disk shelf storage 30 and stand alone optical disk drive 40 represents the ability to manually transfer disks therebetween. Each of the aforementioned items in the data storage hierarchy is connected to host processor 50. The number of host processors or optical disk drives in the various levels of the storage hierarchy are not critical to the present invention. Host processor 50 includes buffer memory 51 used for temporarily storing data as required. Data catalog 60 stores information relevant to the location of data stored in the hierarchy.

The purpose of the data storage hierarchy is to accept data (hereinafter referred to in units known as "objects") at input 99 to host processor 50 and store such objects in a prioritized manner according to the relative age and the likelihood of future access of each object. The objects can exist simultaneously at one or more of buffer memory 51, DASD 10, optical library 20, optical disk shelf storage 30 or optical disk drive 40. The objects are stored on the optical disks in fixed block architecture. The entire side of an optical disk comprises a "volume". Therefore, each optical disk includes two volumes. Each optical disk volume contains data formatted in a particular manner. Although the exact storage format of each volume is not significant to the invention, the optical disks of the present embodiment store data in a spiral track of sequential sectors. The initial sectors contain data for labeling the individual volume, the next series of sectors contain the volume table of contents (VTOC), and the remaining sectors on the disk store the actual data objects. The VTOC includes a list of the object names and the first sector on the disk storing all or part of each object.

The magnetic disks used in DASD 10 may also be formatted in a manner known to one of skill in the art. Such format includes at least a volume table for optical disks. The volume table contains a list of the volume labels and certain information associated with each volume, such as whether the volume exists in optical disk library 20 or optical disk shelf storage 30, the date such disk was last mounted on optical disk drives 21 or 22, if located in the library-the exact location in optical disk storage cells 23, and if located in optical disk shelf storage 30 the shelf location.

Data catalog 60 contains an array of information determining where an object is stored in the data storage hierarchy and specifications for determining when such object is to be moved from one hierarchy level to another. Data catalog 60 is organized by object name. Associated with each object name in the list is the following: the date the object was received by host processor 50, a storage class indicating in which levels of the hierarchy the object is located, the volume and sector in optical library 20, if any, in which the object is stored, the volume and sector of optical disk shelf storage 30, if any, in which the object is stored, and a management class. The management class includes information about each object determining whether backup storage, such as in optical disk shelf storage 30, is required in addition to storage in optical library 20 when the data catalog entry for each object is to be deleted and when each object is to be destaged due to its age in the hierarchy from optical library 20 to optical disk storage shelf 30. The storage and management class information is determined upon entrance of an object into the hierarchy, but may be changed at a later time. Data catalog 60 may be physically located in any rewriteable, random-access recording medium, such as DASD 10. However, for the purpose of clarity, data catalog 60 is shown as a distinct logical entity in FIG. 1.

The aforementioned embodiment allows for the movement of an object from one level of the hierarchy to another without losing track of such object. In addition, when an object is received in host processor 50 which is required to be stored in optical library 20, and none of the optical disks then in optical library 20 have the capacity for storage of the object, host processor 50 can command the destaging of an entire optical disk from optical library 20 to optical disk shelf storage 30. An optical disk from outside of the hierarchy, or from optical disk shelf storage 30 can then be placed in optical disk library 20 to store the required object therein. The optical disk least recently mounted on optical disk drives 21 and 22, irrespective of accesses by host processor 20 to a mounted optical disk, is chosen for destaging, as determined by the information in the volume table stored in DASD 10. Destaging is possible to create storage space in optical library 20 for objects newly input into host processor 50, and for objects to be staged or destaged from another level of the data storage hierarchy (for example DASD 10 or optical disk shelf storage 30).

METHOD OF OPERATION

Again with reference to FIG. 1, the operation of the data storage hierarchy of the invention will now be described. The following description of operation includes the storage of data, the retrieval of data, and the management of data should storage or retrieval require data migration between different levels of the hierarchy.

The storage of data within the hierarchy begins with the input of an object 99 at host processor 50. Processor 50 performs any data translation required by the hierarchy and then stores the object in buffer memory 51. At such time, host processor 50 creates an entry in data catalog 60, as designated by the operator or predisposed rules. Based on the information in the data catalog, such as storage class and management class, host processor 50 commands the placement of the object in the proper location for storage in the hierarchy. In a typical object storage scenario host processor 50 would begin by copying the object from buffer memory 51 into DASD 10, updating any catalogs or tables as necessary, and deleting the object from buffer memory 51. The initial transfer of an object from buffer memory 51 to DASD 10, or any other designated level of the data storage hierarchy, may be batched with other objects so as to minimize the time in which the system is dedicated to data migration. That is, host processor 50 may defer data migration until an off peak load time.

The object now stored in DASD 10 may be rapidly accessed, if necessary by a system user. Host processor 50 will periodically examine data catalog 60 to determine those objects having a management class indicating that migration is necessary. At a prescribed time host processor 50 commands the movement of such objects. In the case of the object which has been stored in DASD 10, it most likely will then need to be moved to either or both optical library 20 or optical disk shelf storage 30. It is also possible, however, that the object will simply be designated for deletion from DASD 10 and from data catalog 60. If the object is to be destaged to optical library 20 or optical disk shelf storage 30, host processor 50 determines from the volume table on DASD 10 which volumes have available storage space. Host processor 50 then commands the mounting of the volumes chosen to receive the object upon optical disk drives 21, 22 or 40 and store the object therein. Simultaneously, host processor 50 updates the storage class in the appropriate entry of data catalog 60 to reflect the new location of the object, and the appropriate entries in the volume table stored on DASD 10 to reflect any updated information required therein. For example, the volume table in DASD 10 needs to be updated to reflect the fact that the volume upon which the object was stored had more recently been mounted than the date then existing in the table. In addition, if the volume was then demounted from an optical disk drive and placed into a different location within storage cells 23 or optical disk storage shelf 30 the volume table would also require updating. Similar procedures are followed for moving objects from optical library 20 to optical disk shelf storage 30 or for deleting objects from the hierarchy altogether. Each time that information is stored on an optical disk the VTOC on the disk would also require updating.

The retrieval of information from storage in the hierarchy begins again with an input by the system to host processor 50. Host processor 50 then examines data catalog 60 to determine where the particular object requested is located. Host processor 50, having determined where such object is located, goes to the respective level of the data storage hierarchy and retrieves the object. Upon copying the object into buffer memory 51, host processor 50 then also updates the appropriate entries in the volume table on DASD 10 or data catalog 60, as necessary. For example, if the object were retrieved from a volume in optical library 20 and the volume required mounting for retrieval of the object, then the volume table requires update of the date last mounted. It is also possible that host processor 50, having determined that the object is likely to be accessed frequently in the future, requires the object to be staged to a higher level in the data storage hierarchy. Host processor 50 then stages the object from one level of storage in the hierarchy to another and again updates the volume table on DASD 10 and data catalog 60, as necessary. The need for such staging may be quite infrequent, depending upon the type of data to be stored in the hierarchy. For example, in a hierarchy designed to store documents for archival purposes, the likelihood of ever requiring access to any single document may be so slim that staging the data would be of little or no benefit. In addition, the type of storage at each level in the hierarchy may also affect one's likelihood to stage data. For example, a data storage hierarchy having an optical library and an optical disk shelf storage which include WORM disks, staging data from the optical disk shelf storage to the optical library would be impractical because the objects cannot be erased from the WORM disks. Thus, frequent data staging would unnecessarily fill the disks to capacity. In addition, stand alone optical disk drives, once a disk from the optical disk shelf storage has been mounted therein, are of approximately the same access speed as the optical disk drives in the optical library. Thus, the staging of data between certain hierarchy levels may be of little value.

At any time an object is to be stored in optical library 20, a problem may arise with respect to the availability of storage space on a volume existing in such library. The object may be data having just arrived at input 99 to host processor 50 for storage in the storage hierarchy, or it may be data being destaged from DASD 10 to optical library 20, or it may be data being staged from optical disk shelf storage 30 to optical library 20. If optical library 20 lacks the available storage space required to store the incoming object, or if the system operator so requires, a disk from optical library 20 is selected to be destaged to optical disk shelf storage 30. At such time, host processor 50 examines the volume table existing in DASD 10 to determine the disk which has least recently been mounted on optical disk drives 21 or 22. For each disk, both volumes thereon are examined. The most recent data of mounting for either volume is then used to determine the least recently mounted disk. Host processor 50 then issues a command to have the chosen disk destaged from optical library 20 to optical disk shelf storage 30. In addition, host processor 50 commands that a scratch disk be inserted into optical library 20 or that a disk from optical disk storage shelf 30 be staged into optical library 20. When the new disk is inserted into optical library 20, host processor 50 will command the disk to be mounted on optical disk drive 21 or 22 and the object be stored therein. In association therewith, host processor 50 will update the VTOC, volume table on DASD 10, and data catalog 60 to reflect the new status of the hierarchy.

Logic errors may cause the least recently mounted optical disk chosen for destaging to be mounted, or appear to be mounted, on optical disk drive 21 or 22. If the optical disk in optical library 20 chosen for destaging is at that time mounted on optical disk drive 21 or 22, host processor 50 will abort the destaging operation and signal for system operator assistance. In an alternative embodiment, host processor 50 commands that such disk first be demounted from its respective optical disk drive and then destaged from optical library 20 to optical disk shelf storage 30. If the disk to be demounted cannot be because it is in use, or if the system cannot locate the disk to be destaged, the command from host processor 50 is aborted. The command is then reissued after first having selected the next least recently mounted volume for destaging.

The aforementioned destaging technique is simple in that only the date of most recent mounting must be maintained in the volume table on DASD 10 for each volume. In addition, host processor 50 is not kept busy transferring data between different levels of the hierarchy during destaging. Since it is possible that the order of recent mounting and recent access of each volume (or object therein) will differ, the simple least recently mounted destaging technique described herein results in more efficient operation of the hierarchy. If WORM optical disks are used in the hierarchy, the inability to physically erase objects from the disk makes the least recently mounted destaging technique by far the most practical. The aforementioned technique is compatible with the operation of truly archival data storage hierarchies in which objects are normally transferred during their lifetime from DASD 10 to both optical library 20 and optical disk shelf storage 30 as primary storage and backup storage respectively.

While the invention has been described with respect to a preferred embodiment thereof, it will be understood by those skilled in the art that various changes in detail may be made therein without departing from the spirit, scope, and teaching of the invention. For example, the number of levels existing in the data storage hierarchy is not considered to be significant to the instant invention. Accordingly, the invention herein disclosed is to be limited only as specified in the following claims.

What is claimed is:

1. A data storage hierarchy connected to a host processor wherein a system operator monitors commands from said host processor comprising:
   a data storage media library connected to the host processor, said data storage media library including data storage media, a device for writing data to and reading data from data storage media mounted thereon, a plurality of media storage cells, and means for transferring said data storage media between said device and said media storage cells;
   other data storage media storage means for receiving data storage media from said data storage media library, the data storage being transferred by said system operator; and
   said host processor identifying the least recently mounted data storage medium and commanding the transfer, from said data storage media library to said other data storage media storage means, only of the data storage medium least recently mounted on said device;
   whereby if the data storage media library does not have the required storage capacity, the data storage medium in the library which was least recently mounted is removed from the library and another data storage medium may then be inserted.

2. The data storage hierarchy of claim 1 wherein:
   said data storage media library includes a plurality of said devices for writing data to and reading data from data storage media mounted thereon; and
   said means in the host processor commands the transfer, from the data storage media library to said other data storage media storage means, only of the data storage medium least recently mounted on any one of said devices.

3. The data storage hierarchy of claim 1 further comprising means for writing data to and reading data from data storage media outside of said data storage media library, said means for writing and reading data connected to the host processor.

4. A data storage hierarchy connected to a host processor wherein a system operator monitors commands from said host processor comprising:
   an optical storage media library connected to the host processor, said optical storage media library including optical recording media, a device for writing data to and reading data from optical recording media mounted thereon, a plurality of media storage cells, and means for transferring said optical recording media between said device and said media storage cells;
   an optical storage media shelf for receiving optical recording media from said optical storage media library, the optical recording media being transferred by said system operator; and
   the host processor identifying the least recently mounted optical recording media and commanding the transfer, from said optical storage media library to said optical storage media shelf, of the first optical recording medium least recently mounted on said device;
   whereby if the optical storage media library does not have the required storage capacity, the optical recording medium in the optical storage media library which was least recently mounted is removed from the library and another optical recording medium may then be inserted.

5. The data storage hierarchy of claim 4 wherein:
   said data storage media library includes a plurality of devices for writing data to and reading data from optical recording media mounted thereon; and
   said means in the host processor commands the transfer, from the data storage media library to the data storage media shelf, of the first optical recording medium least recently mounted on any one of said devices.

6. The data storage hierarchy of claim 4 further comprising means for writing data to and reading data from optical storage media outside of said optical storage media library, said means for writing and reading data connected to the host processor.

7. A data storage hierarchy connected to a host processor wherein a system operator monitors commands from the host processor comprising:
   an optical disk library connected to the host processor, said optical disk library including write-once optical disks, an optical disk drive for writing data to and reading data from optical disks mounted thereon, a plurality of optical disk storage cells, and means for transferring said optical disks between said optical disk drive and said optical disk storage cells;
   an optical disk shelf for receiving optical disks from said optical disk library, the optical disks being transferred by the system operator; and
   the host processor identifying the least recently mounted optical disks and commanding the movement, from the optical disk library to the optical disk shelf, of the first optical disk least recently mounted on said optical disk drive in said optical disk library;
   whereby if the optical disk library does not have the required storage capacity, the optical disk in the optical disk library which was least recently mounted is removed from the optical disk library and another optical disk may then be inserted.

8. The data storage hierarchy of claim 7 wherein:
   said optical disk library includes a plurality of optical disk drives for writing data to and reading data from optical disks mounted thereon; and
   said means in the host processor commands the transfer, from the optical disk library to the optical disk shelf, of the first optical disk least recently mounted on any one of said optical disk drives in said optical disk library.

9. The data storage hierarchy of claim 7 further comprising a magnetic storage device connected to the host processor.

10. The data storage hierarchy of claim 8 further comprising a magnetic storage device connected to the host processor.

11. The data storage hierarchy of claim 7 further comprising an optical disk drive outside of said optical disk library for writing data to and reading data from optical disks mounted thereon, said optical disk drive outside of said optical disk library connected to the host processor.

12. The data storage hierarchy of claim 8 further comprising an optical disk drive outside of said optical disk library for writing data to and reading data from optical disks mounted thereon, said optical disk drive outside of said optical disk library connected to the host processor.

13. A method for destaging data in a data storage hierarchy connected to a host processor wherein the host processor issues commands to a system operator, and having a data storage media library and other data storage media storage means, the data storage media library connected to said host processor and including data storage media, a plurality of devices for writing data to and reading data from data storage media mounted thereon, a plurality of media storage cells, and means for transferring the data storage media between the devices and the media storage cells, the other data storage media storage means capable of receiving data storage media from said data storage media library, comprising the machine-executed steps of:
   determining which data storage medium in the data storage media library has least recently been mounted upon any one of the devices; and
   commanding the system operator to transfer, from the data storage media library to the other data storage media storage means, of the first data storage medium least recently mounted on any one of the devices;
   whereby if the data storage media library does not have the required storage capacity, the data storage medium in the library which was least recently mounted is removed from the library and another data storage medium may then be inserted.

14. The method of claim 13 further comprising, prior to said step of commanding the transfer, the machine-executed step of:
   determining whether the data storage medium in the data storage media library which has least recently been mounted upon any one of the devices is currently mounted upon one of the devices; and if so
   commanding the demount of the first data storage medium in the data storage media library which has least recently been mounted upon any one of the devices.

15. The method of claim 14 further comprising the machine-executed steps of:
   determining whether the command to demount the first data storage medium in the data storage media library which has least recently been mounted upon any one of the devices has successfully been completed; and if not
   commanding the transfer, from the data storage media library to the data storage media shelf, of the first data storage medium next least recently mounted on any one of the devices.

* * * * *